US007922218B2

(12) United States Patent
Maier et al.

(10) Patent No.: US 7,922,218 B2

(45) Date of Patent: Apr. 12, 2011

(54) SHEAR RING CASING COUPLER DEVICE

(75) Inventors: William C. Maier, Almond, NY (US); Harry F. Miller, Allegany, NY (US)

(73) Assignee: Dresser-Rand Company, Olean, NY (US)

( * ) Notice: Subject to any disclaimer, the term of this patent is extended or adjusted under 35 U.S.C. 154(b) by 356 days.

(21) Appl. No.: 12/215,184

(22) Filed: Jun. 25, 2008

(65) Prior Publication Data

US 2009/0324404 A1 Dec. 31, 2009

(51) Int. Cl.
*F16L 23/00* (2006.01)

(52) U.S. Cl. ........................................ 285/406; 285/408

(58) Field of Classification Search .................. 285/408, 285/410, 411, 406, 364, 368, 332, 370
See application file for complete search history.

(56) References Cited

U.S. PATENT DOCUMENTS 1,622,768 A * 3/1927 Cook et al. .................... 285/368
2,328,031 A 8/1943 Risley
2,836,117 A * 5/1958 Lankford ...................... 285/370
2,868,565 A * 1/1959 Suderow ....................... 285/406
3,044,657 A * 7/1962 Horton .......................... 285/332
3,220,245 A * 11/1965 Van Winkle .................. 285/364
3,352,577 A * 11/1967 Medney ........................ 285/368
3,628,812 A * 12/1971 Larralde et al. ............... 285/364
4,146,261 A * 3/1979 Edmaier et al. ............... 285/364
4,205,927 A 6/1980 Simmons
4,573,527 A * 3/1986 McDonough ................. 285/368
4,984,830 A * 1/1991 Saunders ...................... 285/368
5,024,585 A 6/1991 Kralovec
5,443,581 A * 8/1995 Malone ......................... 285/364
5,951,066 A * 9/1999 Lane et al. .................... 285/364
5,967,746 A 10/1999 Hagi et al.
6,123,363 A * 9/2000 Burgard et al. ............... 285/364
6,467,988 B1 10/2002 Czachor et al.
6,658,986 B2 12/2003 Pitla et al.
6,688,802 B2 2/2004 Ross et al.
6,715,802 B2 * 4/2004 Baker ........................... 285/368
6,764,284 B2 7/2004 Oehman, Jr.
6,824,171 B2 * 11/2004 Milberger et al. ............ 285/369
7,481,464 B2 * 1/2009 Fusser ........................... 285/370
7,527,306 B2 * 5/2009 Ben-Horin .................... 285/368

* cited by examiner

*Primary Examiner* — David E Bochna
(74) *Attorney, Agent, or Firm* — Edmonds & Nolte, PC

(57) ABSTRACT

A coupler device is for connecting first and second casings to form a casing assembly with a central axis, each casing having an inner end disposed against the inner end of the other casing such that the casings are spaced along the axis. The coupler device includes at least one generally arcuate connector having a first portion engageable with the first casing and a second portion engageable with the second casing so as to connect the two casings, the connector extending at least partially circumferentially about the casing axis. A retainer is disposeable either generally within or generally about the at least one connector and is configured to prevent radial displacement of the connector with respect to the axis so as to maintain engagement of the connector with the first and second casings.

12 Claims, 9 Drawing Sheets

SHEAR RING CASING COUPLER DEVICE

The present invention relates to fluid machinery, and more particularly to high pressure casings for such machinery.

Fluid machinery such as centrifugal compressors each typically includes a casing for containing working components such as one or more impellers mounted on a rotatable shaft. The casing includes one or more inlets for directing fluid inwardly toward the compressor working components and one or more outlets for directing pressurized fluid outwardly from the casing for subsequent processing or ultimate usage. Further, such casings are often formed as an assembly of two or more separate casings, such as a first casing for housing the compression working components and a second casing for housing a driver (e.g., electric motor, gas turbine, etc.). As such, the casing assembly requires one or more coupler devices to connect adjacent pairs of the casings, which generally must enable removable coupling of the casings to permit periodic maintenance and/or repair of the compressor or driver components.

SUMMARY OF THE INVENTION

In one aspect, the present invention is a coupler device for connecting first and second casings to form a casing assembly with a central axis, each casing having an inner end disposed against the inner end of the other casing such that the casings are spaced along the axis. The coupler device comprises at least one generally arcuate connector having a first portion engageable with the first casing and a second portion engageable with the second casing so as to connect the two casings. The connector extends at least partially circumferentially about the casing axis. Further, a retainer is disposeable either generally within or generally about the connector and is configured to prevent radial displacement of the connector with respect to the axis so as to maintain engagement of the connector with the first and second casings.

In another aspect, the present invention is a casing assembly comprising first and second casings, each one of the first and second casings having an inner end disposed one of generally against the inner end of the other one of the two casings and generally proximal to the inner end of the other one of the two casings. The two casings are generally centered about and spaced along a central longitudinal axis. A coupler device includes at least one generally arcuate connector having a first portion engageable with the first casing and a second portion engageable with the second casing so as to connect the two casings. The connector extends at least partially circumferentially about the casing axis. Further, a retainer is disposeable either generally within or generally about the connector and is configured to prevent radial displacement of the connector with respect to the axis so as to maintain engagement of the connector with the first and second casings.

In a further aspect, the present invention is again a coupler device for connecting first and second casings to form a casing assembly with a central axis, each casing having an inner end disposed against the inner end of the other casing such that the casings are spaced along the axis and a recess located adjacent to the casing end. The coupler device comprises at least one generally arcuate connector having a first lug engageable with the first casing recess and a second lug engageable with the second casing recess so as to connect the two casings. The connector further includes first and second angled surface sections each facing generally away from the other angled surface section. The connector extends at least partially circumferentially about the casing axis. Further, a retainer is disposeable generally within or generally about the at least one connector and is configured to prevent radial displacement of the connector with respect to the axis so as to maintain the first and second lugs engaged with the casing recesses. The retainer includes first and second axially spaced members, each connector member having an angled outer circumferential surface facing generally toward the angled surface of the other one of the first and second connector members. Furthermore, the retainer first member angled surface is disposeable against the connector first angled surface section and the retainer second member angled surface is disposeable against the connector second angled inner surface section. The first and second retainer members are adjustably connected such that the two retainer members are displaceable generally toward each other so as to bias the connector generally radially with respect to the casing axis to engage the retainer lugs with the casing recesses.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
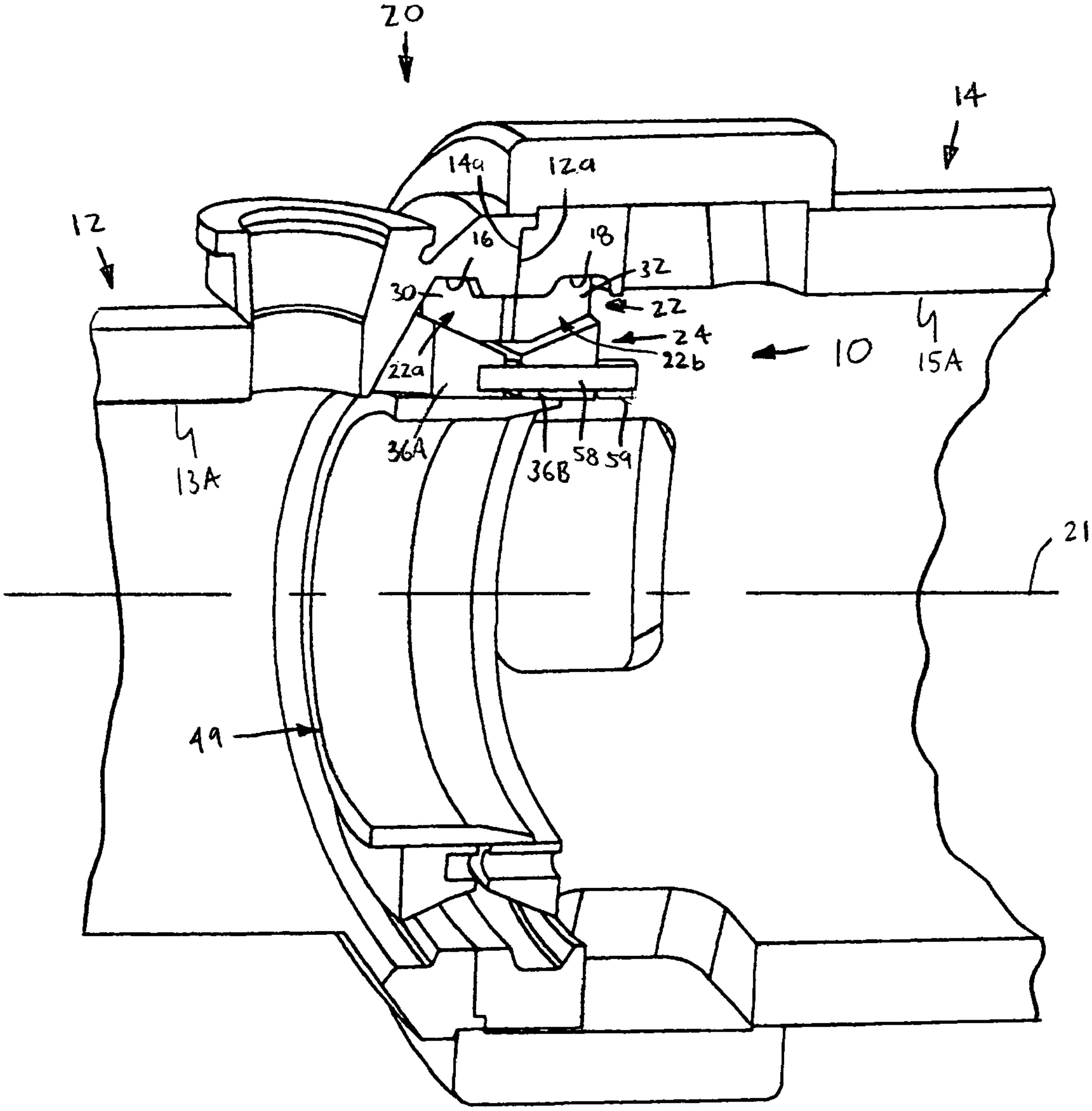
FIG. 1 is a broken-away, perspective view of a coupler device and casing assembly in accordance with a first construction of the present invention.

Certain terminology is used in the following description for convenience only and is not limiting. The words "right", "left", "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-9 a coupler device 10 for connecting first and second casings 12, 14 to form a casing assembly 20 with a central longitudinal axis 21. Each casing 12, 14 has an inner end 12*a*, 14*a* disposed against, or located at least generally proximal to, the inner end 14*a*, 12*a* of the other casing 14, 12, respectively, such that the casings 12, 14 are generally centered about and spaced along the axis 21. The coupler device 10 basically includes at least one and preferably a plurality of generally arcuate connectors 22 and a retainer 24. Each connector 22 has a first portion 22*a* engageable with the first casing 12 and a second portion 22*b* engageable with the second casing 14 so as to connect the two casings 12, 14, such the casing inner ends 12*a*, 14*a* generally fixed together or immovably attached. Also, each connector 22 extends at least partially circumferentially about the casing axis 21, the plurality of connectors being circumferentially spaced about the axis. Further, the retainer 24 is disposeable either generally within (FIGS. 1 and 2) or generally about (FIGS. 3-8) the connector 22 and is configured to prevent radial displacement of the connector 22 with respect to the axis 21 so as to maintain engagement of the connector 22 with the first and second casings 12, 14.

Preferably, each one of the first and second casings 12, 14 has a recess 16, 18, respectively and the connector first portion 22*a* includes a first lug 30 disposeable within the first casing recess 16 and the connector second portion 22*b* includes a second lug 32 disposeable within the second casing recess 18. With this preferred structure, the retainer 14 is basically configured to maintain the first and second lugs 30, 32 disposed within the first and second casing recesses 16, 18, respectively. More specifically, each casing 12, 14 has at least an inner circumferential surface 13A, 15A, respectively and/or at least an outer circumferential surface 13B, 15B, respectively, and preferably both the inner and outer circumferential surfaces. Further, each casing recess 16, 18 extends either radially outwardly from the casing inner circumferential surface 13A, 15A (FIGS. 1-3) or radially inwardly from the casing outer circumferential surface 13B, 15B (FIGS. 4-9). In either arrangement, each casing recess 16, 18 also preferably extends circumferentially entirely about the casing axis 21.

Furthermore, each connector portion lug 30, 32 extends either generally radially outwardly from a remainder of the connector 22 so as to be disposeable within a separate one of the radially-outwardly extending casing recesses 16, 18 or radially inwardly from a remainder of the connector 30 so as to be disposeable within a separate one of the radially-inwardly extending casing recesses 16, 18. As such, the retainer 24 is configured to either prevent displacement of the connector 22 in a radial direction generally toward the casing axis 21 to maintain the connector lugs 30, 32 engaged with radially-outwardly extending casing recesses 16, 18 or to prevent displacement of the connector 22 in a radial direction generally away from the casing axis 21 to maintain the connector lugs 30, 32 engaged with radially-inwardly extending casing recesses 16, 18.

Figure 6:
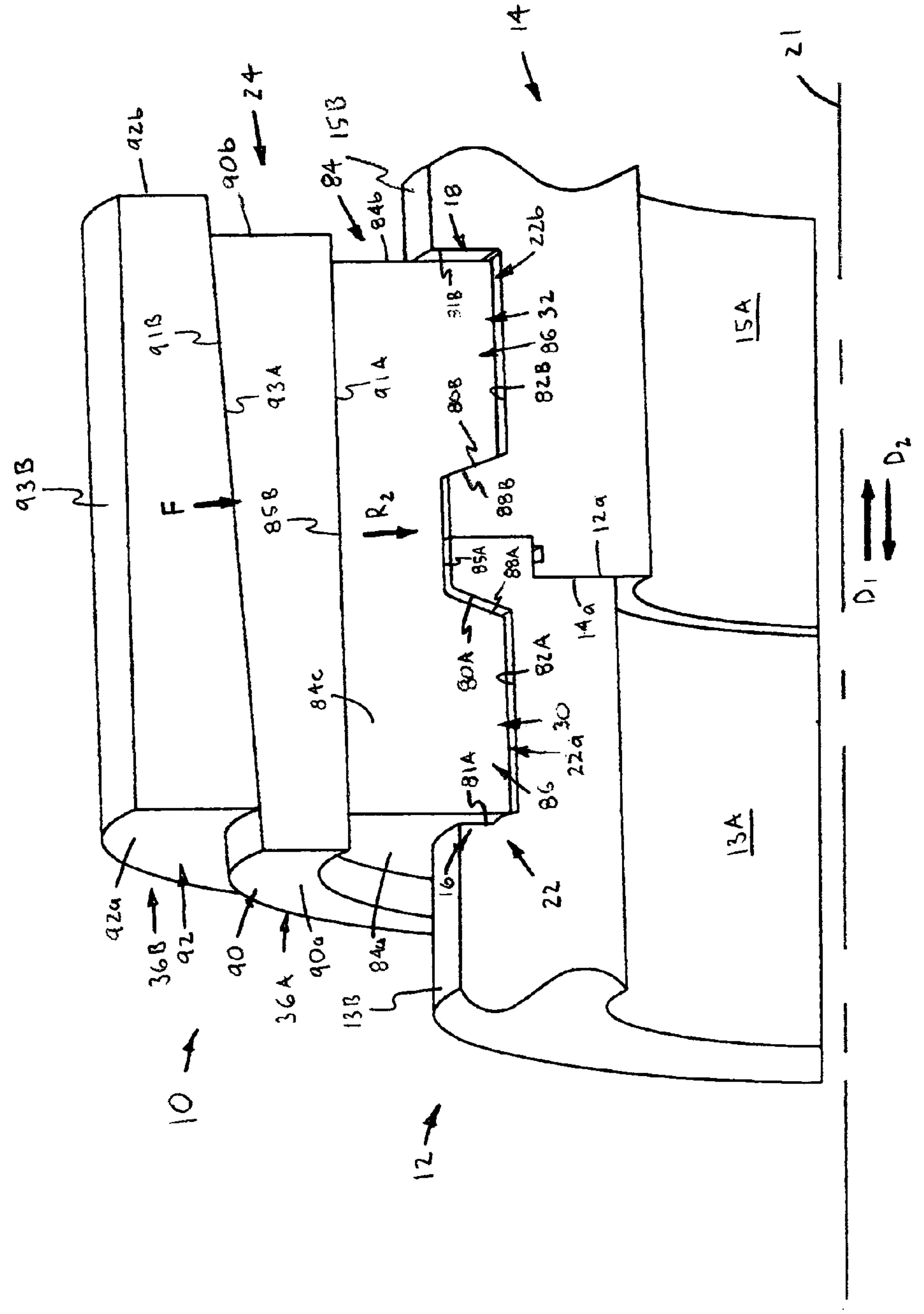
FIG. 6 is a broken-away, perspective view of the coupler device and casing assembly in accordance with a third construction of the present invention.
Figure 7:
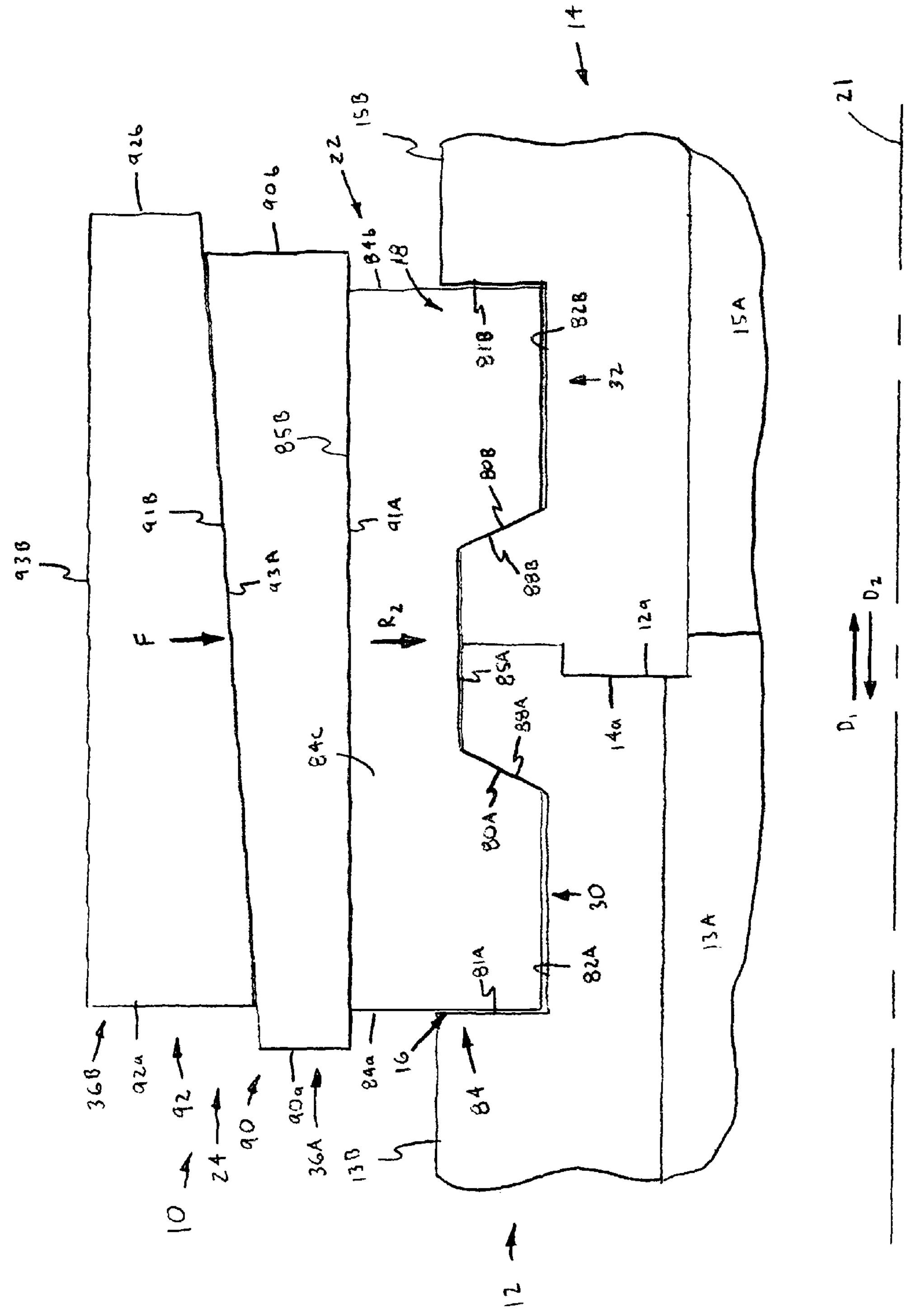
FIG. 7 is a broken-away, axial cross-sectional view of the third construction coupler device and casing assembly.
Figure 8:
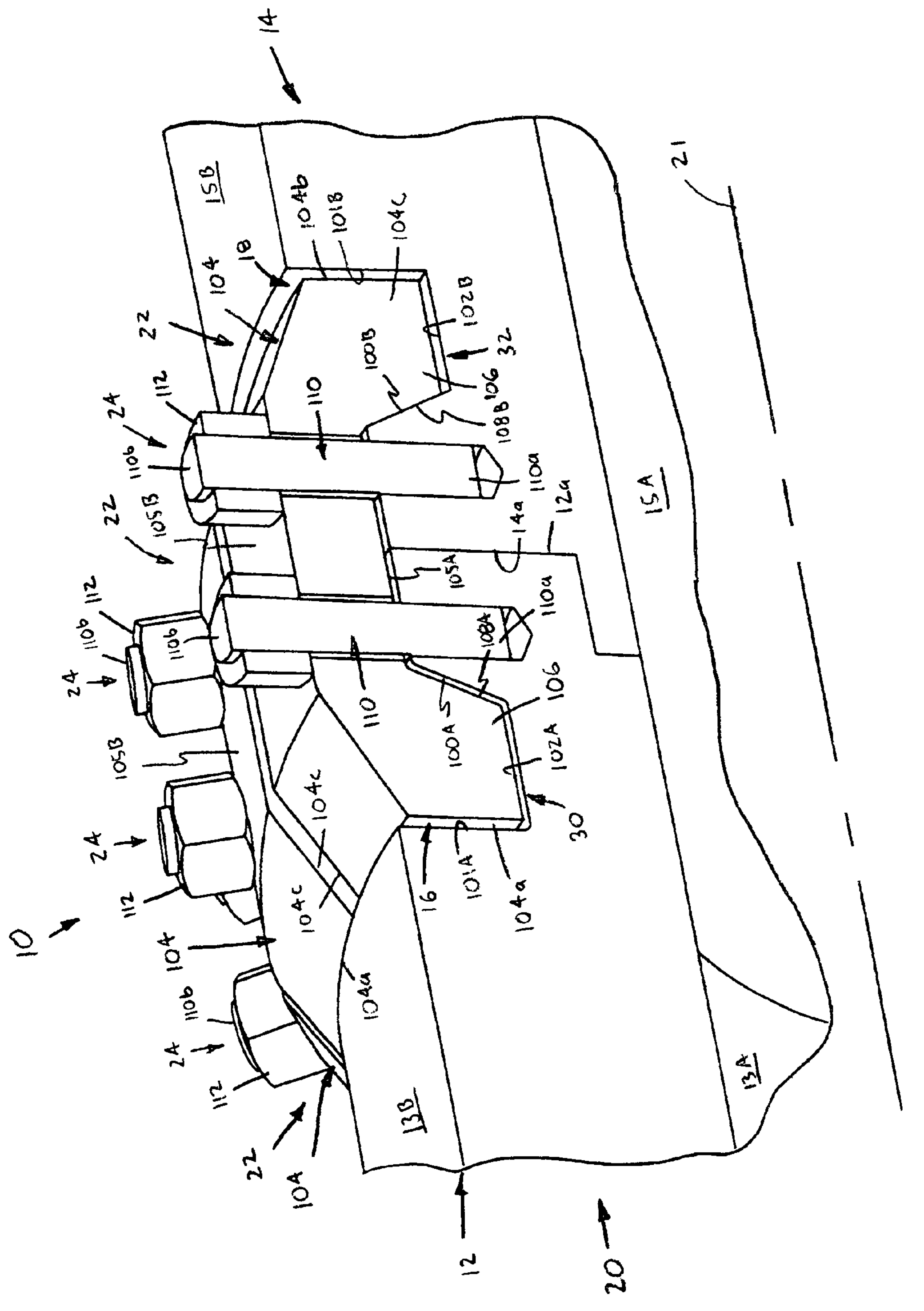
FIG. 8 is a broken-away, perspective view of the coupler device and casing assembly in accordance with a fourth construction of the present invention.
Figure 9:
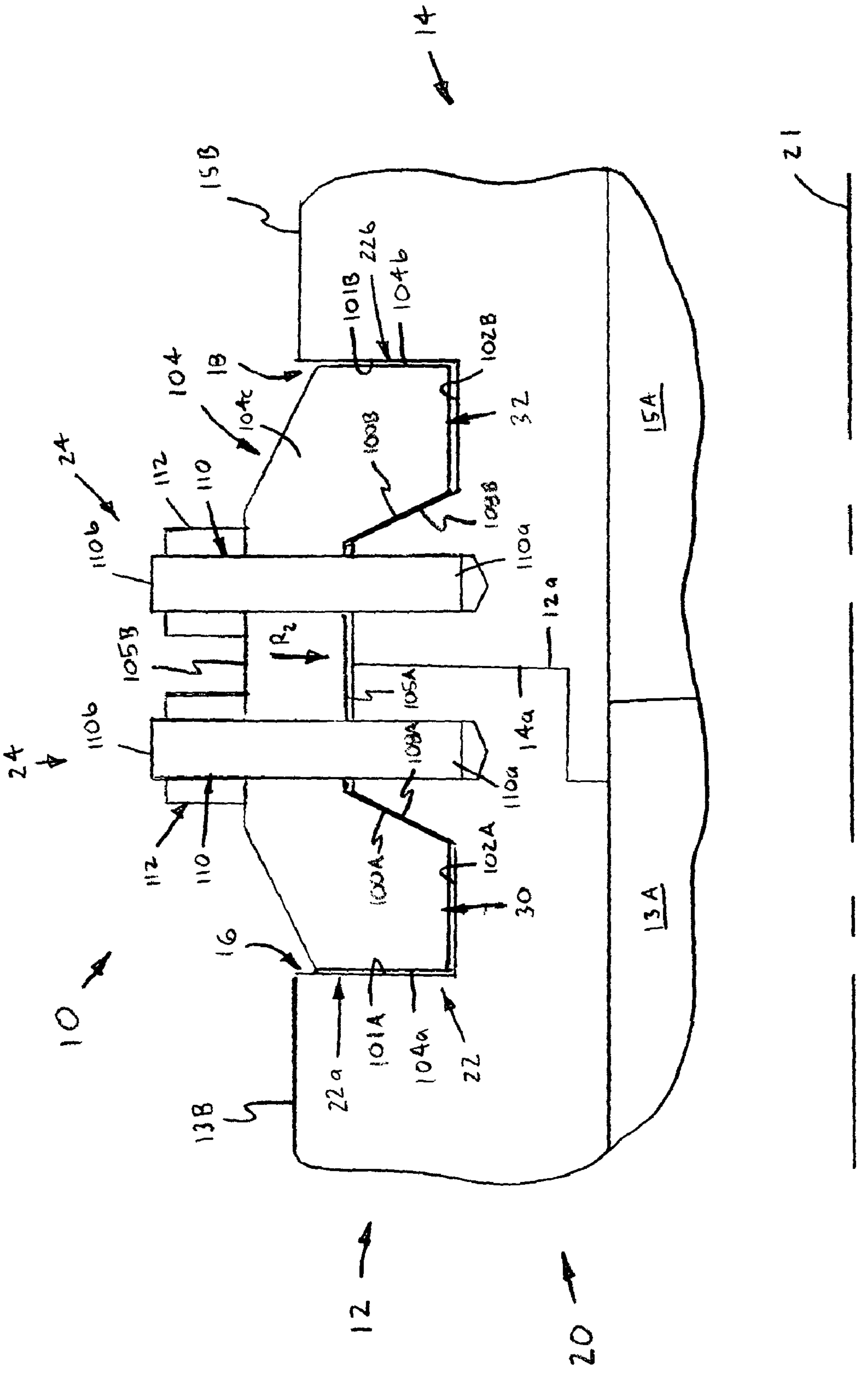
FIG. 9 is a broken-away, axial cross-sectional view of the first construction coupler device and casing assembly.

Preferably, the connector 22 has a pair of angled, generally opposing contact surfaces or surface sections 34A, 34B, and the retainer 24 includes first and second axially spaced, generally annular members 36A, 36B each having an angled "drive" surface 37A, 37B disposed generally against a separate one of the connector angled contact surfaces 34A, 34B, respectively. The retainer first and second members 36A, 36B are adjustably connected such that the two retainers members 36A, 36B are displaceable generally toward each other along the axis 21 so as to bias the connector 24 either generally radially outwardly toward the casing inner surfaces 13A, 15A, or radially inwardly toward the casing outer surfaces 13B, 15B, as described in further detail below. In other embodiments, such as shown in FIGS. 6 and 7, the retainer 24 includes two "overlapping" annular members 40, 42 or may include a plurality of threaded rods or fasteners 44, as shown in FIGS. 8 and 9.

Having described the basic structure of the coupler device 10 and casing assembly 20 of the present invention, these and other components and/or features of the various constructions of the coupler device 10 and casing assembly 20 are described in greater detail below.

Figure 2:
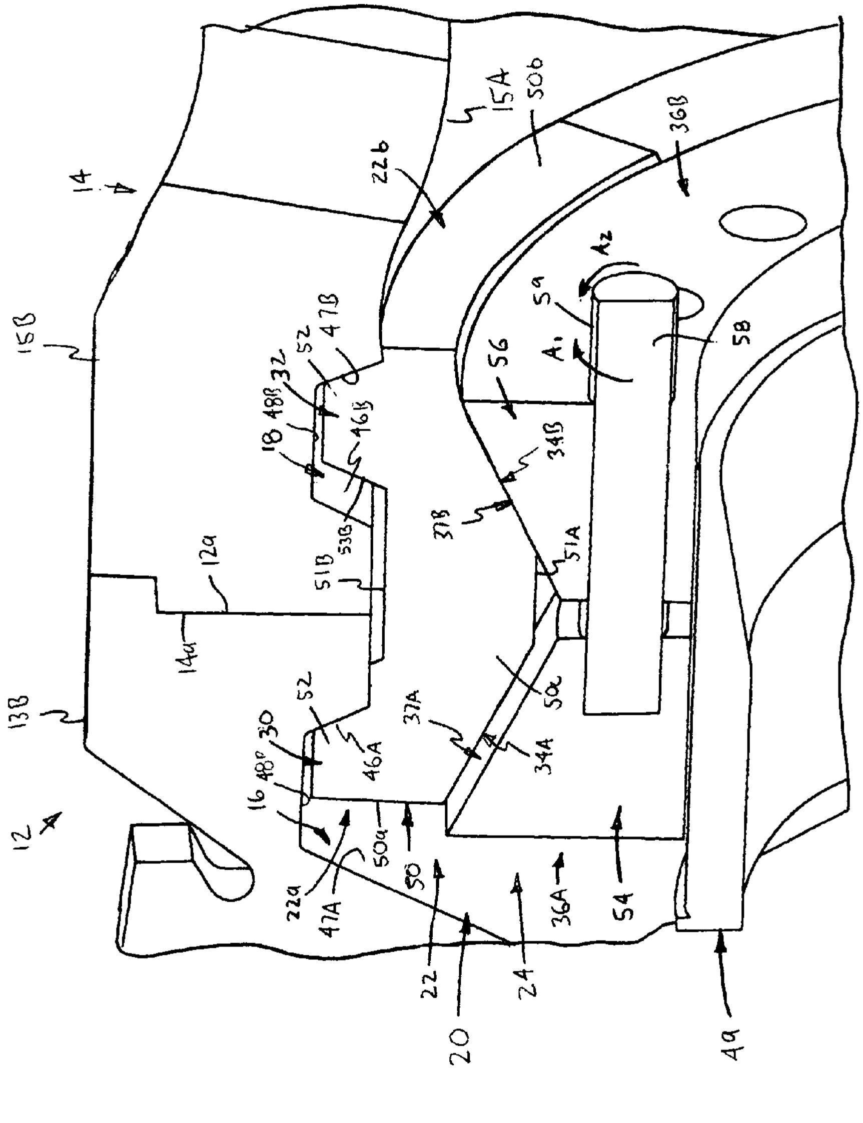
FIG. 2 is an enlarged view of a portion of FIG. 1.
Figure 3:
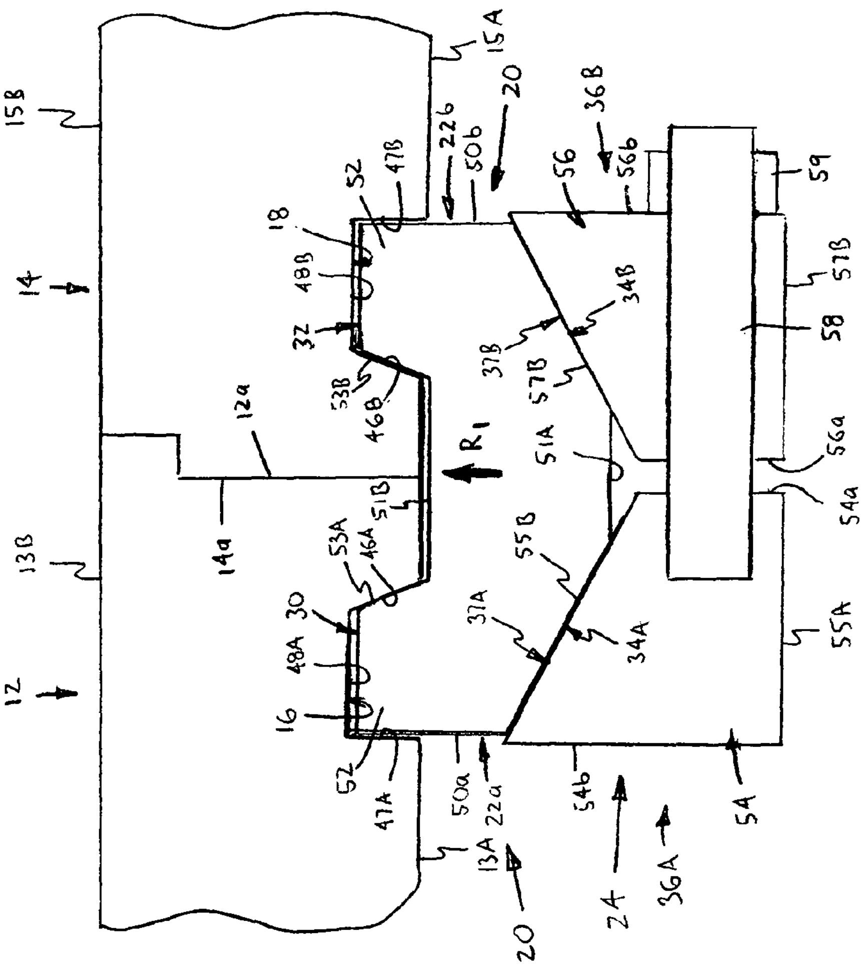
FIG. 3 is a broken-away, axial cross-sectional view of the first construction coupler device and casing assembly.

Referring first to FIGS. 1-3, in a first construction, the coupler device 10 engages with the casing inner surfaces 13A, 15A, and is thus disposed within an interior chamber $C_C$ of the casing assembly 20. With such an arrangement, each casing recess 16, 18 extends radially outwardly from the inner circumferential surface 13A, 15A, respectively, of the particular casing 12, 14 and each connector portion lug 30, 32 extends radially outwardly from a remainder of the connector 22, with the retainer 24 being configured to prevent displacement of the connector 22 in a radial direction $R_1$ generally toward the casing axis 21.

Specifically, each casing recess 16, 18 is partially defined by an angled radial contact surface 46A, 46B, a facing radial surface 47A, 47B, and an inner circumferential surface 48A, 48B extending axially between the radial surfaces, the three surfaces 46, 47 and 48 extending circumferentially about the casing axis 21. Each one of the two casing recess angled contact surfaces 46A, 46B face generally away from the other one of the two casing recess angled surfaces 46B, 46A, for reasons discussed below.

Further, each connector 22 includes a generally arcuate body 50 with two opposing axial ends 50*a*, 50*b*, opposing radial ends 50*c* (only one shown) and inner and outer circumferential surfaces 51A, 51B. The first and second lugs 30, 32 extend from the outer surface 5B and each preferably includes a generally rectangular shoulder 52 extending circumferentially between the radial ends 50*c*, the two shoulders 52 being spaced apart and each located generally adjacent to a separate one of the axial ends 50*a* or 50*b*. Preferably, each one of the first and second connector lugs 30, 32 has an angled drive surface 53A, 53B formed on the annular shoulder 52 and extending at least partially circumferentially about the casing axis 21. Each one of the two lug angled drive surfaces 53A, 53B faces generally toward the other one of the two lug angled surfaces 53B, 53A, respectively. Furthermore, the first lug angled surface 53A is disposed against the first casing recess angled contact surface 46A and the second lug angled surface 53B is disposed against the second casing recess angled surface 46B.

With the above lug and recess structure, displacement of the connector 22 in the radially outward direction $R_1$ (i.e., away from the axis 21) biases the end 12*a*, 14*a* of each one of the first and second casings 12, 14 generally toward the end 12*a*, 14*a* of the other one of the first and second casings 12, 14. That is, the facing angled drive surfaces 53A, 53B of the connector body 50 slide outwardly against the angled contact surfaces 46A, 46B of the casing recesses 16, 18 so as to force or "wedge" the two casing ends 12*a*, 14*a* together. Also, the connector angled contact surface sections 34A, 34B are formed or provided on the body inner surface 51A and extend circumferentially between the body radial ends 50*c*. Each contact surface 34A or 34B faces generally toward an adjacent one of the two axial ends 50*a*, 50*b*, respectively, and generally away from the other angled surface section 34B, 34A, respectively, for reasons described in detail below.

Still referring to FIGS. 1-3, the retainer 24 of the first coupler construction has first and second retainer members 36A, 36B that each include a generally annular body 54, 56, respectively. Each retainer annular body 54, 56 has an inner axial end 56*a*, 56*a*, an outer axial end 54*b*, 56*b*, an inner circumferential surface 55A, 57A, and an outer circumferential surface 55B, 57B providing one of the angled drive surfaces 37A, 37B. The two annular bodies 54, 56 are arranged such that the body inner ends 56 are disposed at least generally adjacent to each other and each angled drive surface 37A, 37B faces generally toward the angled surface 37B, 37A on the other retainer body 56, 54. The two retainer bodies 54, 56 are sized to be disposed radially inwardly of the connector body 50 such that the retainer first angled outer surface 37A is disposed against the connector first angled inner surface section 34A and the retainer second angled outer surface 37B is disposed against the connector second angled inner surface section 34B. As such, axial movement of the retainer bodies 54, 56 displaces the connector 12 radially, as described below.

Further, the two retainer bodies 54, 56 are preferably adjustably connected by a plurality of threaded rods 58 extending axially through the second body 56 and secured within the first body 54 and a plurality of nuts 59 each engageable with the rod 58 and contactable with the outer end 56*b* of the second body 56. Preferably, the rods 58 and nuts 59 are spaced circumferentially apart on the two bodies 54, 56, as best shown in FIG. 2. Further, rotation of each nut 59 in a first angular direction $A_1$ displaces each retainer body 54, 56 generally toward the other body 56, 54, and rotation of the nuts 59 in a second angular direction $A_2$ enables each body 54, 56 to displace generally away from the other body 56, 54.

With the above structure, displacement of the retainer bodies 54, 56 axially toward each other cause each retainer angled drive surface 37A, 37B to slide against the associated angled contact surface 34A, 34B, respectively, of the connectors 22 while displacing toward the other drive surface 37B, 37A, which forces or wedges the connectors 22 to displace radially outwardly. Such radial outward displacement of the connectors 22 cause the connector lugs 30, 32 to advance into the casing recesses 16, 18 to securely connect the casing ends 12*a*, 14*a*, as described above. Alternatively, displacement of the retainer bodies 54, 56 axially away from each other cause each retainer angled drive surface 37A, 37B to displace away from each other, which enables the connectors 22 to displace radially inwardly. Such radial inward displacement of the connectors 22 cause the connector lugs 30, 32 to withdraw from the casing recesses 16, 18, thereby disconnecting the casing ends 12*a*, 14*a*.

Referring to FIGS. 1 and 2, the first construction of the coupler device 10 also preferably comprises a generally tubular guide member 49 disposed radially inwardly of the retainer 24 and configured to generally retain the connectors 22 disposed adjacent to the casing recesses 16, 18 during installation and removal of the coupler device 10. Specifically, the guide member 49 at least temporarily supports the plurality of connectors 22 prior to insertion of the two retainer bodies 54, 56 between the guide member 49 and the connectors 22 and after removal of the retainer bodies 54, 56 during casing disassembly.

Figure 4:
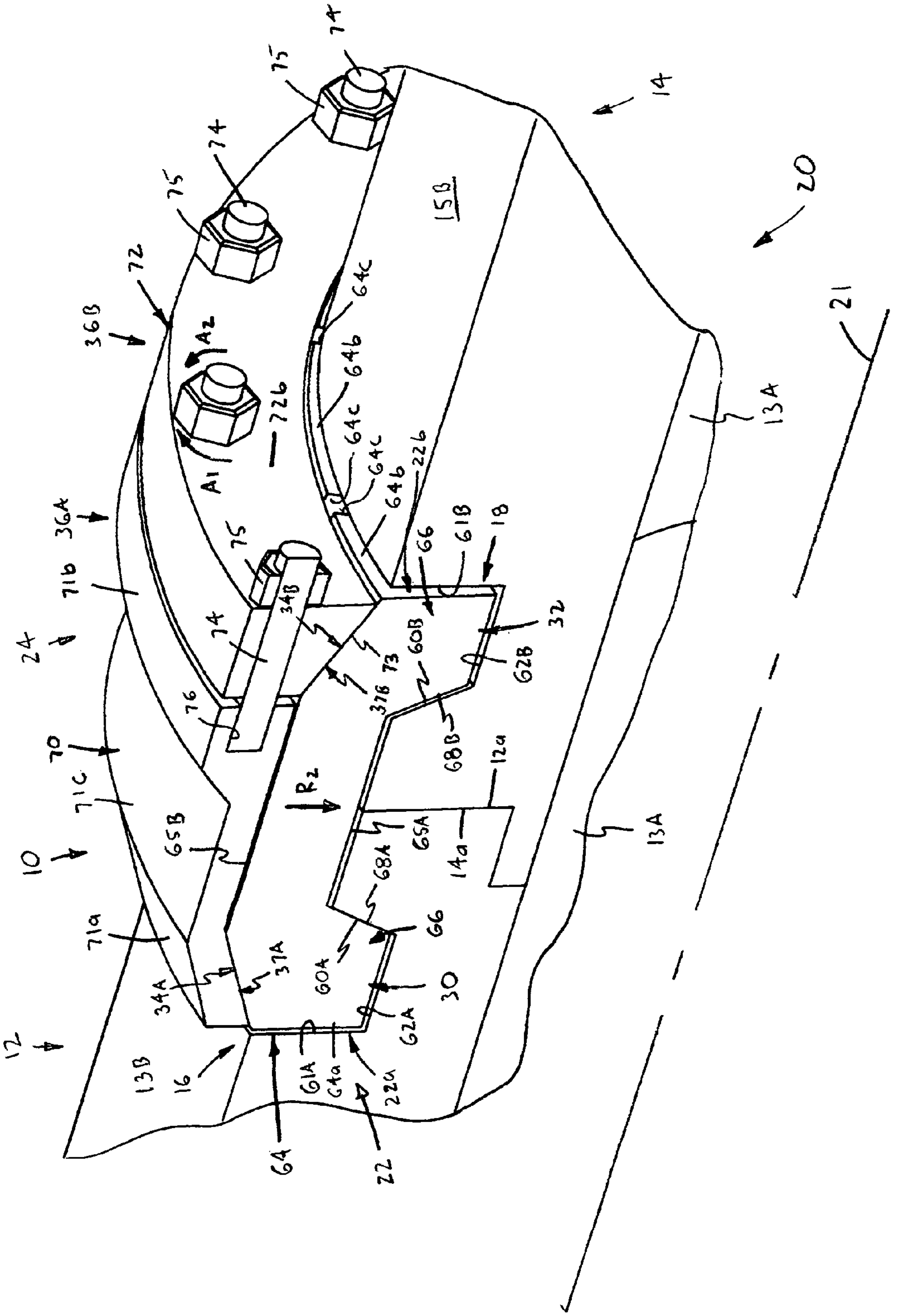
FIG. 4 is a broken-away, perspective view of the coupler device and casing assembly in accordance with a second construction of the present invention.
Figure 5:
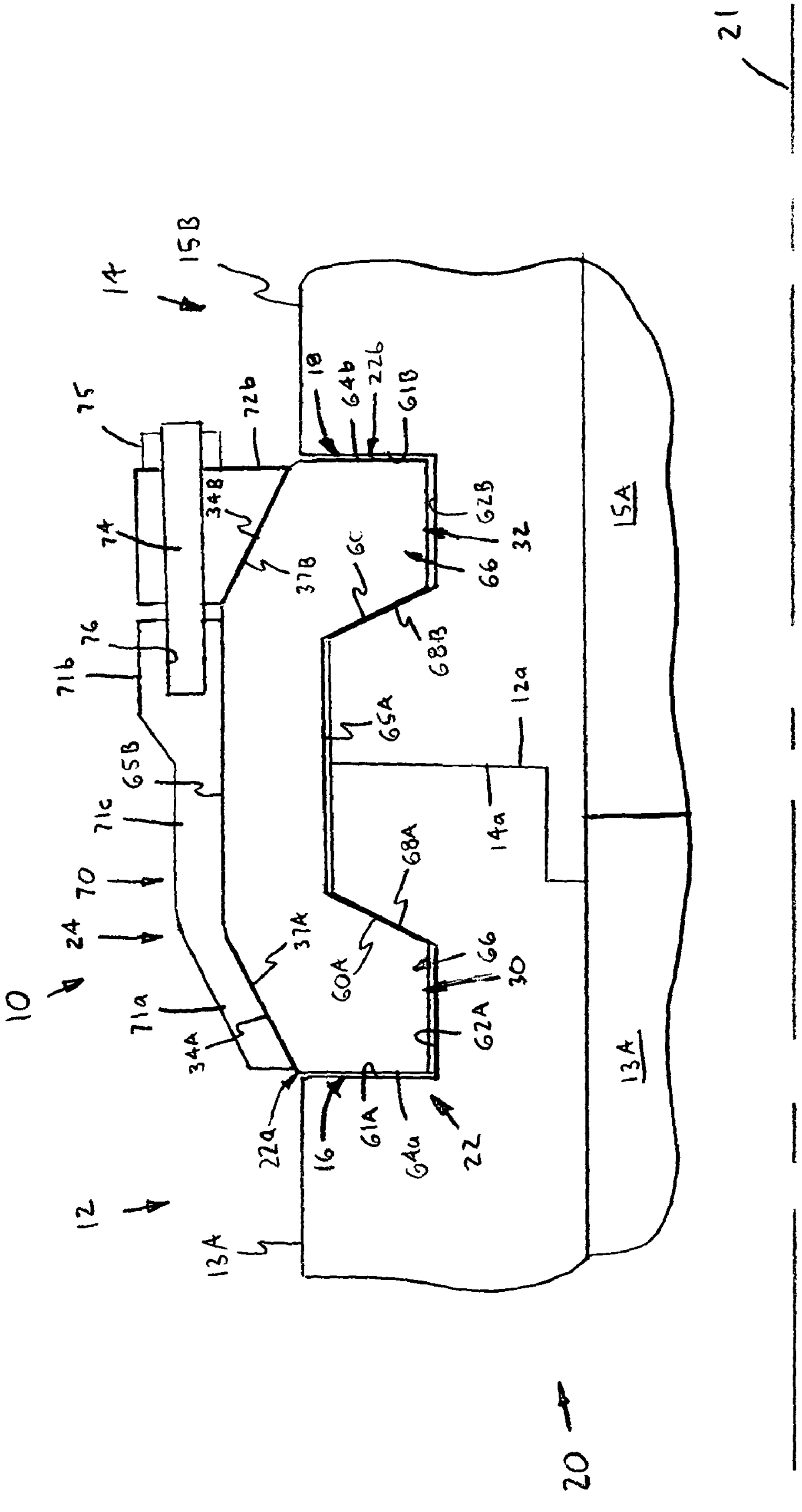
FIG. 5 is a broken-away, axial cross-sectional view of the second construction coupler device and casing assembly.

Referring now to FIGS. 4 and 5, in a second construction of the coupler device 10 and casing assembly 20, the coupler device 10 engages with the casing outer surfaces 13B, 15B, and is thus disposed externally of the casings 12, 14. With such an arrangement, each casing recess 16, 18 extends radially inwardly from the outer circumferential surface 13B, 15B, respectively, of the particular casing 12, 14 and each connector portion lug 30, 32 extends radially inwardly from a remainder of the connector 22, with the retainer 24 being configured to prevent displacement of the connector 22 in a radial direction $R_2$ generally away from the casing axis 21.

Specifically, each casing recess 16, 18 is partially defined by an angled radial contact surface 60A, 60B, a facing radial surface 61A, 61B, and an outer circumferential surface section 62A, 62B extending axially between the radial surfaces, the three surfaces 60, 61 and 62 extending circumferentially about the casing axis 21. Each one of the two casing recess angled contact surfaces 60A, 60B faces generally away from the other one of the two casing recess angled surfaces 60B, 60A, for reasons discussed below.

Further, each connector 22 includes a generally arcuate body 64 with two opposing axial ends 64*a*, 64*b*, opposing radial ends 64*c*, and inner and outer circumferential surfaces 65A, 65B. The first and second lugs 30, 32 extend from the body inner surface 65A and each preferably includes a generally rectangular shoulder 66 extending circumferentially between the radial ends 64*c*, the two shoulders 64 being spaced apart and each located generally adjacent to a separate one of the axial ends 64*a* or 64*b*. Preferably, each one of the first and second connector lugs 30, 32 has an angled drive surface 68A, 68B formed on the annular shoulder 66 and extending at least partially circumferentially about and facing generally towards the casing axis 21. Each one of the two lug angled drive surfaces 68A, 68B also faces generally toward the other one of the two lug angled surfaces 68B, 68A, respectively. Furthermore, the first lug angled surface 68A is disposeable or disposed against the first casing recess angled contact surface 60A and the second lug angled surface 68B is disposeable/disposed against the second casing recess angled surface 60B.

With the above lug and recess structure, displacement of the connector 22 in the radially inward direction $R_2$ (i.e., toward the axis 21) biases the end 12*a* or 14*a* of each one of the first and second casings 12, 14 generally toward the end 12*a*, 14*a* of the other one of the first and second casings 12, 14. That is, the connector facing angled drive surfaces 68A, 68B slide inwardly against the casing recess angled contact surfaces 60A, 60B so as to force or "wedge" the two casing ends 12*a*, 14*a* together. Also, the connector angled contact surface sections 34A, 34B are formed or provided on the outer surface 65B of each connector body 64, extend circumferentially between the body radial ends 64*c* and face generally away from the casing axis 21. Each connector contact surface 34A or 34B also faces generally toward an adjacent one of the two axial ends 64*a*, 64*b*, respectively, and generally away from the other angled surface section 34B, 34A, respectively, for reasons described in detail below.

Still referring to FIGS. 4 and 5, the retainer 24 of the second coupler construction has first and second retainer members 36A, 36B that each include a generally annular body 70, 72, respectively. Each retainer annular body 70, 72 has an inner axial end 70*a*, 72*a*, an outer axial end 70*b*, 72*b*, an inner circumferential surface 71A, 73A providing one of the angled drive surfaces 37A, 37B, and an outer circumferential surface 71B, 73B. The two annular bodies 70, 72 are arranged such that the body inner ends 70*a*, 72*a* are disposed at least generally adjacent to each other and each angled drive surface 37A, 37B faces generally toward the angled surface 37B, 37A on the other retainer body 72, 70. The two retainer bodies 70, 72 are sized to be disposed radially outwardly of the connector body 64, and are thus diametrically larger than the casing outer surfaces 13B, 15B, and are arrangeable/arranged such that the retainer first angled inner surface 37A is disposed against the connector first angled outer surface section 34A and the retainer second angled inner surface 37B is disposed against the connector second angled outer surface section 34B. As such, axial movement of the retainer bodies 70, 72 displaces the connector 12 radially, as described below.

Preferably, the first retainer body 70 is generally tubular and has three sections: an outer, angled section 71*a* providing the angled drive surface 37A, an inner, radially enlarged section 71*b* having a plurality of "blind holes" 76 (one shown), as discussed below, and a central portion 71*c* extending axially between and connecting the inner and outer sections 71*a*, 71*b*. The second retainer body 72 is preferably formed as a generally rectangular ring with the angled drive surface 37*b* extending axially entirely along the body inner surface 73. Further, each of the retainer bodies 70, 72 is preferably formed of a plurality of semicircular, partial-circular or arcuate sections (not indicated), so as to facilitate installation about the connectors 22, but may alternatively be provided by one-piece annular bodies or rings.

Further, the two retainer bodies 70, 72 are preferably adjustably connected by a plurality of threaded rods 74 extending axially through the second body 72 and secured within a separate one of the blind holes 76 of the first body 70 and a plurality of nuts 75 each engaged with the rod 74 and contactable with the outer end 72*b* of the second body 72. Preferably, the rods 74 and threaded openings are spaced circumferentially apart on the two bodies 70, 72, as best shown in FIG. 4. Further, rotation of each nut 75 in a first angular direction $A_1$ displaces each retainer body 70, 72 generally toward the other body 72, 70, and rotation of the nuts 75 in a second angular direction $A_2$ enables each body 70, 72 to be displaced generally away from the other body 72, 70.

With the above structure, displacement of the retainer bodies 70, 72 axially toward each other cause each retainer angled drive surface 37A, 37B to slide against the associated angled contact surface 34A, 34B, respectively, of the connectors 22 while displacing toward the other drive surface 37B, 37A, which forces or wedges the connectors 22 to displace radially inwardly. Such radial inward displacement of the connectors 22 cause the connector lugs 30, 32 to advance into the casing recesses 16, 18 to securely connect the casing ends 12*a*, 14*a*, as described above. Alternatively, displacement of the retainer bodies 70, 72 axially away from each other cause each retainer angled drive surface 37A, 37B to displace away from each other, which enables the connectors 22 to displace radially outwardly. Such radial outward displacement of the connectors 22 permits the connector lugs 30, 32 to be withdrawn from the casing recesses 16, 18, thereby disconnecting the casing ends 12*a*, 14*a*.

Referring now to FIGS. 6 and 7, in a third construction of the coupler device 10 and casing assembly 20, the coupler device 10 engages with the casing outer surfaces 13B, 15B, and is thus disposed externally of the casings 12, 14 as with the second construction. As with the second construction, each casing recess 16, 18 extends radially inwardly from the outer circumferential surface 13B, 15B, respectively, of the particular casing 12, 14 and each connector portion lug 30, 32 extends radially inwardly from a remainder of the connector 22, with the retainer 24 being configured to prevent displacement of the connector 22 in a radial direction $R_2$ generally away from the casing axis 21.

Specifically, each casing recess 16, 18 is partially defined by an angled radial contact surface 80A, 80B, a facing radial surface 81A, 81B, and an outer circumferential surface section 82A, 82B extending axially between the radial surfaces, the three surfaces 80, 81 and 82 extending circumferentially about the casing axis 21. Each one of the two casing recess angled contact surfaces 80A, 80B faces generally away from the other one of the two casing recess angled surfaces 80B, 80A, for reasons as discussed above with the second construction and in further detail below.

Further, each connector 22 includes a generally arcuate body 84 with two opposing axial ends 84*a*, 84*b*, opposing radial ends 84*c* (only one shown) and inner and outer circumferential surfaces 85A, 85B. The first and second lugs 30, 32 extend from the body inner surface 85A and each preferably includes a generally rectangular, annular body portion 86 extending circumferentially between the radial ends 84*c*, the two annular body portions 86 being axially spaced apart and each located generally adjacent to a separate one of the axial ends 84*a* or 84*b*. Preferably, each one of the first and second connector lugs 30, 32 has an angled drive surface 88A, 88B formed on the annular body portion 86 and extending at least partially circumferentially about and facing generally towards the casing axis 21. Each one of the two lug angled drive surfaces 88A, 88B also faces generally toward the other one of the two lug angled surfaces 88B, 88A, respectively. Furthermore, the first lug angled surface 88A is disposeable or disposed against the first casing recess angled contact surface 80A and the second lug angled surface 88B is disposeable/disposed against the second casing recess angled surface 80B.

With the above lug and recess structure, displacement of the connector 22 in the radially inward direction $R_2$ (i.e., toward the axis 21) biases the end 12*a* or 14*a* of each one of the first and second casings 12, 14 generally toward the end 14*a*, 12*a* of the other one of the first and second casings 14, 12, in a manner generally similar with the second coupler and casing construction. That is, the connector facing angled drive surfaces 88A, 88B slide inwardly against the casing recess angled contact surfaces 80A, 80B so as to force or "wedge" the two casing ends 12*a*, 14*a* together.

However, in contrast with the both the first and second coupler constructions, each connector body 84 is formed without angled contact surfaces engageable by the retainer 24. Rather, the body outer circumferential surface 85B is substantially "radially constant", i.e., the body outside radius does not vary on the outer surface 85B.

Still referring to FIGS. 6 and 7, the retainer 24 of the third coupler construction has first and second retainer members 36A, 36B that include inner and outer generally annular members 90, 92, respectively. Each generally annular member 90, 92 has an opposing axial ends 90*a*, 92*a*, an inner circumferential surface 91A, 93A and an outer circumferential surface 91B, 93B, respectively. The inner member 90 is disposed generally between the connector body 84 and the outer member 92 such that the inner member inner surface 91A is disposed against the connector body outer surface 85B and the inner member outer surface 91B is disposed against the outer member inner surface 93A. Further, the inner member outer surface 91B and the outer member inner surface 93A are each generally angled and arranged such that each surface 91B, 93A faces generally toward the other surface 93A, 91B and are juxtaposeable against each other.

With this structure, axial displacement of the outer member 92 relative to the inner member 90 in a first axial direction $D_1$ biases the inner member 90 generally radially inwardly toward the connector 22. That is, as the outer body 92 displaces axially in the first direction $D_1$, the outer body inner surface 93A, slides against the inner body outer surface 91B and forces the inner body 90 to displace or at least compress radially inwardly. Thereby, the inner member 90 exerts a radially inwardly directed force F on the connector 22 such that the connector lug drive surfaces 88A, 88B slide along or are at least biased against, the casing recess contact surfaces 80A, 80B as discussed above. Alternatively, axial displacement of the outer member 92 relative to the inner member 90 in a second, opposing axial direction $D_2$ removes the radially-inwardly directed compressive force on the inner body 90, thereby permitting removal of the inner body 90 and thereafter the connector 22 so as to disengage the lugs 30, 32 from the casing recesses 16, 18.

Referring to FIGS. 8 and 9, in a fourth construction of the coupler device 10 and casing assembly 20, the coupler device 10 is disposed externally of the casings 12, 14 and engages with the casing outer surfaces 13B, 15B, as with the second and third constructions. Thus, each casing recess 16, 18 extends radially inwardly from the outer circumferential surface 13B, 15B, respectively, of the particular casing 12, 14, each connector portion lug 30, 32 extends radially inwardly from a remainder of the connector 22, and the retainer 24 is configured to prevent displacement of the connector 22 in a radial direction $R_2$ generally away from the casing axis 21.

Specifically, each casing recess 16, 18 is partially defined by an angled radial contact surface 100A, 100B, a facing radial surface 101A, 101B, and an outer circumferential surface section 102A, 102B extending axially between the radial surfaces, the three surfaces 100, 101 and 102 extending circumferentially about the casing axis 21. Each one of the two casing recess angled contact surfaces 100A, 100B faces generally away from the other one of the two casing recess angled surfaces 100B, 100A, so as to engage with complementary lug drive surfaces 108, 108B in a manner discussed below.

Further, each connector 22 includes a generally rectangular bar 104 having opposing axial ends 104*a*, 104*b*, opposing radial ends 104*c* and inner and outer surfaces 105A, 105B. Each rectangular bar 104 is sized substantially "circumferentially smaller", i.e., has a much lesser circumferential extent, in comparison with the connector bodies 50, 64, 84 of the first, second, and third constructions, respectively. As such, the fourth construction has a greater number of the connectors 22 in comparison with the previously described constructions.

Further, the first and second connector lugs 30, 32 extend from the body inner surface 105A and each preferably includes a generally rectangular body portion 106 extending circumferentially between the radial ends 104*c*, the two annular body portions 106 being axially spaced apart and each located generally adjacent to a separate one of the axial ends 104*a* or 104*b*. Preferably, each one of the first and second connector lugs 30, 32 has an angled drive surface 108A, 108B formed on the rectangular body portion 106 and extending at least partially circumferentially about and facing generally towards the casing axis 21. Each one of the two lug angled drive surfaces 108A, 108B also faces generally toward the other one of the two lug angled surfaces 108B, 108A, respectively. Furthermore, the first lug angled surface 108A is disposeable or disposed against the first casing recess angled contact surface 100A and the second lug angled surface 108B is disposeable/disposed against the second casing recess angled surface 100B. Thus, displacement of the connector 22 in the radially inward direction $R_2$ (i.e., toward the axis 21) biases the end 12*a* or 14*a* of each one of the first and second casings 12, 14 generally toward the end 12*a*, 14*a* of the other one of the first and second casings 12, 14, in a manner generally similar with the second and third coupler and casing constructions.

As best shown in FIG. 8, the fourth construction of the coupler device 10 preferably includes a plurality of retainers 24, most preferably two retainers 24 for each connector 22. Specifically, each retainer 24 preferably includes a threaded rod or fastener 110 and a nut 112 engageable with the rod 110. Each rod 110 has a first end 110*a* connected with the one of the casings 12, 14 and a second end 110*b* extending outwardly of the connector body 84, the second end 110*b* being threaded so as to be engageable by the nut. As such, each nut 112 clamps against the connector body outer surface 105B, so as to force the connector lugs 30, 32 to displace radially inwardly to connect the casing ends 12*a*, 14*a*.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A coupler device for a casing assembly, comprising:

at least one connector having an arcuate shape and extending at least partially around a casing axis of the casing assembly, the connector comprising:

two axial ends;

an inner circumferential surface having first and second angled surface sections each facing toward an adjacent one of the two axial ends and away from the other of the first and second angled surface sections;

an outer circumferential surface; and first and second lugs extending outwardly from the outer circumferential surface, the first lug configured to be received into a first recess defined in a first casing of the casing assembly and the second lug configured to be received into a second recess of a second casing of the casing assembly so as to connect the first and second casings, the first and second recesses extending radially outward from an inner circumferential surface of the first and second casings, respectively; and a retainer at least partially disposable radially inside of the connector, the retainer comprising first and second members that are axially spaced apart, the first and second members each having an angled outer circumferential surface facing toward the angled outer circumferential surface of the other one of the first and second members, the angled outer circumferential surface of the first member being disposable against the first angled surface section of the inner circumferential surface of the connector and the angled outer circumferential surface of the second member being disposable against the second angled surface section of the inner circumferential surface of the connector, the retainer being configured to prevent radial displacement of the connector toward the casing axis so as to maintain engagement of the connector with the first and second casings.

2. The coupler device as recited in claim 1, wherein the first and second members of the retainer are adjustably connected such that the first and second members are displaceable toward each other so as to bias the connector radially outwardly against the first and second casings.

3. The coupler device as recited in claim 1, wherein the at least one connector comprises a plurality of connectors spaced circumferentially about the casing axis.

4. The coupler device as recited in claim 1, wherein the first and second members of the retainer are annular bodies, each being adjustably connected so as to be displaceable along the casing axis.

5. A casing assembly, comprising:

first and second casings, each one of the first and second casings having an inner circumferential surface, a recess extending radially outward from the inner circumferential surface, and an inner end, wherein the inner end of the first casing is disposed proximal to the inner end of the second casing, the first and second casings being centered about a casing axis; and a coupler device including:

at least one connector having an arcuate shape, two axial ends, an inner circumferential surface defining first and second angled surface sections each facing toward an adjacent one of the two axial ends and away from the other angled surface section, an outer circumferential surface, and first and second lugs extending radially outward from the outer circumferential surface, the first lug configured to be received into the first recess and the second lug configured to be received into the second recess so as to connect the first and second casings, the connector extending at least partially circumferentially about the casing axis; and a retainer sized to fit between the connector and the casing axis, the retainer including first and second members that are axially spaced apart, each of the first and second members having an angled outer circumferential surface facing toward the angled outer circumferential surface of the other one of the first and second members, the outer circumferential surface of the first member of the retainer being disposable against the first angled surface section of the inner circumferential surface of the connector and the angled outer circumferential surface of the second member of the retainer being disposable against the second angled surface section of the inner circumferential surface of the connector, the retainer configured to prevent radial displacement of the connector toward the casing axis so as to maintain the first and second lugs received into the first and second recesses, respectively.

6. The casing assembly as recited in claim 5, wherein the at least one connector comprises a plurality of connectors spaced circumferentially about the casing axis.

7. The casing assembly as recited in claim 5, wherein the first and second members of the retainer are annular bodies, each being adjustably connected so as to be displaceable along the casing axis.

8. The casing assembly as recited in claim 7, wherein displacing the first and second members of the retainer toward each other biases the connector radially outward against the first and second casings.

9. The casing assembly as recited in claim 5, wherein:

the recess of first casing is partially defined by an angled surface extending circumferentially about the casing axis, and the recess of the second casing is partially defined by an angled surface extending circumferentially about the casing axis, the angled surfaces of the first and second casings facing away from each other;

each one of the first and second lugs has an angled surface extending at least partially circumferentially about the casing axis, each one of the angled surfaces of the first and second lugs facing toward each other, the angled surface of the first lug being disposed against the angled surface of the recess of the first casing and the angled surface of the second lug being disposed against the angled surface of the recess of the second casing such that displacement of the connector radially outward from the casing axis biases the first and second casings together.

10. The casing assembly as recited in claim 5, wherein the first and second members of the retainer are adjustably connected by a plurality of threaded rods and a plurality of nuts, each one of the plurality of nuts being engageable with a separate one of the plurality of threaded rods such that rotation of each of the plurality of nuts in a first direction displaces one of the first and second members toward the other one of the first and second members to bias the connector radially outward, and rotation of each of the plurality of nuts in a second, opposing direction displaces each one of the first and second members away from the other one of the first and second members so as to permit the connector to displace radially inward.

11. The casing assembly as recited in claim 5, further comprising a tubular liner member disposed within the retainer.

12. A coupler device for connecting first and second casings comprising:

a connector having an arcuate shape, a first lug engageable with a recess defined in the first casing, a second lug engageable with a recess defined in the second casing, so as to connect the first and second casings, and first and second angled surface sections each facing away from each other, the connector extending at least partially circumferentially about a casing axis; and a retainer disposeable within or about the at least one connector and configured to prevent radial displacement of the connector with respect to the casing axis so as to maintain the first lug engaged with the recess of the first casing and to maintain the second lug engaged with the recess of the second casing, the retainer including axially spaced first and second members, each of the first and second members having an angled outer circumferential surface facing toward the angled outer circumferential surface of the other one of the first and second members, the first member angled outer circumferential surface being disposeable against the first angled surface section of the connector and the angled surface of the second member being disposeable against the second angled surface section of the connector, the first and second members being adjustably connected such that the first and second members are displaceable toward each other so as to bias the connector radially with respect to the casing axis to engage the first lug with the recess of the first casing and second lug with the recess of the second casing.

* * * * *